United States Patent
Höfer et al.

(10) Patent No.: US 6,198,534 B1
(45) Date of Patent: Mar. 6, 2001

(54) SCANNING UNIT FOR AN OPTICAL POSITION MEASURING SYSTEM

(75) Inventors: Volker Höfer, Stein/Traun; Wolfgang Holzapfel, Obing; Walter Huber, Traunstein; Elmar Mayer, Tacherting/Reit, all of (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/130,702

(22) Filed: Aug. 7, 1998

(30) Foreign Application Priority Data

Aug. 7, 1997 (DE) .............................................. 197 34 136

(51) Int. Cl.⁷ .................................................. G01N 11/00
(52) U.S. Cl. ...................... 356/399; 356/400; 250/237 G
(58) Field of Search ................... 356/354, 358, 356/356; 250/237 G (56) References Cited

U.S. PATENT DOCUMENTS

| 3,985,448 | 10/1976 | Wiklund et al. . |
| 4,263,506 | 4/1981 | Epstein . |
| 4,866,268 | 9/1989 | Tang et al. . |
| 5,739,911 | 4/1998 | Holzapfel et al. . |
| 5,777,322 | 7/1998 | Holzapfel et al. . |
| 5,994,692 | 11/1999 | Holzapfel . |

FOREIGN PATENT DOCUMENTS

| 35 36 466 A1 | 4/1987 | (DE) . |
| 195 30 560 A1 | 2/1997 | (DE) . |
| 0 714 015 A2 | 5/1996 | (EP) . |
| 0 735 346 A2 | 10/1996 | (EP) . |
| 0 754 933 A2 | 1/1997 | (EP) . |

*Primary Examiner*—Robert Kim
(74) *Attorney, Agent, or Firm*—Brinks Hofer Gilson & Lione (57) ABSTRACT

A scanning unit for an optical position measuring system is disclosed which, besides periodic incremental signals, also provides at least one reference pulse signal at a defined reference position of a scale and a scanning unit which is movable relative to it. For scanning a reference mark on the scale, the scanning unit comprises a scanning plate with at least one reference mark scanning field and/or at least one reference pulse detector element. A filtering effect results either from the design of the reference mark scanning field or by the design of one or several reference mark detector elements in such a way that the periodic incremental signal portion of the reference pulse signal next to the reference position can be eliminated to a great extent.

29 Claims, 8 Drawing Sheets

PRIOR ART

Fig.8

SCANNING UNIT FOR AN OPTICAL POSITION MEASURING SYSTEM

FIELD OF THE INVENTION

The present invention relates to a scanning unit for a position measuring system which, besides periodic incremental signals, also generates at least one reference pulse signal at a defined reference position of a scale and of a scanning unit which can be moved in relation to the latter, wherein the scanning unit contains at least one reference mark scanning field and/or at least one reference pulse detector element for scanning a reference mark. The present invention also relates to an optical measuring system which, besides incremental signals, also provides at least one reference pulse signal at a defined reference position of a scale and a scanning unit which is movable relative to it, wherein a reference mark is arranged in at least one incremental graduation of the scale.

BACKGROUND OF THE INVENTION

As a rule, known optical position measuring systems provide, in addition to the incremental signals with respect to the relative displacement of two elements, so-called reference pulse signals. At a defined relative position it is possible by these signals to establish an exact absolute relation of the elements which can be moved with respect to each other. To generate the reference pulse signals, fields with reference marks are arranged at one or several places on the scale. Among other elements, the scanning unit of the optical position measuring system includes at least one reference mark scanning field, by which an appropriate reference pulse signal can be generated at the relative position of the scale and the scanning unit to be detected.

There are various options regarding the arrangement of the reference marks on the scale, or respectively the associated scanning fields on the scanning unit.

For example, it is known from U.S. Pat. No. 4,263,506 to arrange the reference marks laterally on the scale next to the graduation track with the incremental graduation. However, a problem here is that, if the scale and the scanning unit are twisted on an axis vertically with respect to the plane of the scale or scanning, the exact association of the reference pulse signal to a defined period of the incremental signal is possibly no longer assured.

Besides this it is also possible to integrate the reference marks directly into the graduation track with the incremental graduation, such as is suggested in U.S. Pat. No. 3,985,448. To this end it is possible, for example, to omit one or several strips or lines of the incremental graduation at the desired position of the scale in the incremental graduation. Further variations regarding the integration of reference marks into the track with the incremental graduation are known from German Patent Publication DE 35 36 466 A1, or from U.S. Pat. No. 4,866,269. It is proposed in these references to design the reference marks in the incremental graduation as a periodic sequences of lines or strips, or to utilize areas with optical properties, which differ from the remainder of the incremental graduation, as reference marks.

Figure 8:
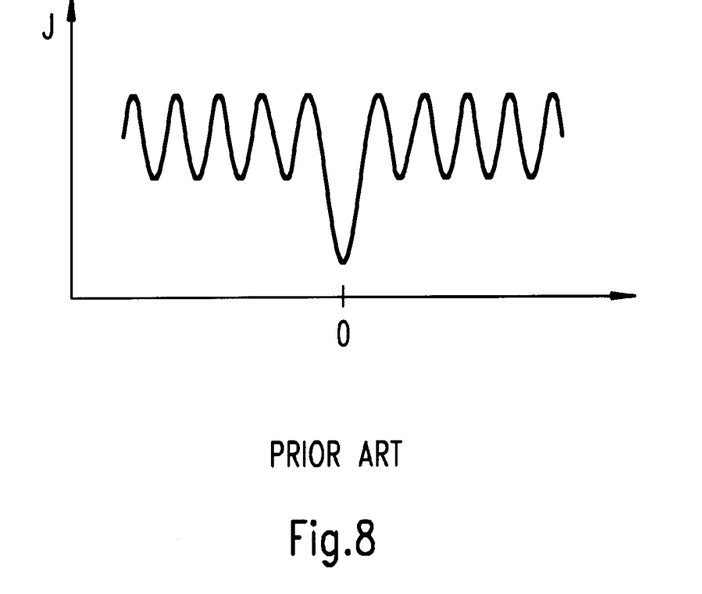
FIG. 8 is a representation of a reference pulse signal which was generated in accordance with the prior art.

However, it has been shown to be problematic in connection with the integration of reference marks into the incremental graduation that next to the actual reference position it is customary to superimpose a periodic signal resulting from the incremental graduation of the scale on the detected reference pulse signal. An exemplary representation of the signal progression in this area is shown in FIG. 8. As a result, the modulation of the reference pulse signal is greatly reduced, i.e., assured detection of the reference pulse signal at the reference position is correspondingly difficult.

Of course it should also be pointed out as a further requirement in connection with the integration of a reference mark into the incremental graduation, that the smallest possible interference with the incremental signals by the reference pulse signal should result.

SUMMARY OF THE INVENTION

It is therefore an object of the present invention to produce a scanning unit for an optical position measuring system, wherein the above mentioned problems in connection with the detection of a reference pulse signal are minimized.

Because of the optical filtering effect provided in accordance with the invention, it is now assured that the reference pulse signal can be definitely detected at the respective reference position. The periodically modulated incremental signal portion now no longer exists at the reference pulse signal next to the reference position, instead a signal portion with a very constant, or respectively steady amplitude exists. In this case at least the fundamental wave of the incremental signal portion of the reference pulse signal is now filtered. A more dependable, or respectively simpler detection of the reference pulse signal is possible at the reference position.

A number of options exist regarding the required optical filter effect. For example, it is possible to employ a suitably designed screen, or respectively amplitude structures in connection with the reference mark scanning field. However, it is also possible to achieve this filtering effect with the aid of phase structures in the transparent areas of the reference mark scanning field. Furthermore there are of course combined possibilities between these different filtering arrangements.

Further advantages of the scanning unit in accordance with the invention result if the phase structures mentioned are used for filtering in connection with an advantageous embodiment of the scanning unit in accordance with the invention, and if these areas furthermore have a focusing optical effect. In particular, the result is a reduced sensitivity to tilting of the scanning unit around the line direction of the scanned graduation structures. Thus, in case of slight tilting of the scale in the line or strip direction, a very much smaller portion of the light beams passing through the scanning plate during the second passage is cut off because of the embodiment selected than with conventional embodiments of the scanning unit. The association of the reference pulse signals with the corresponding incremental signal period remains assured because of the closeness of the neutral rotating point to the scale, more so than is the case with conventional scanning arrangements.

It is furthermore possible to achieve a higher signal intensity on the detector side with this embodiment of the scanning unit, or respectively of the reference mark scanning field, if focusing optical elements are employed.

A number of embodiments result in connection with the design of the optical filter structure, or respectively with the selection of suitable focusing optical elements in the reference mark scanning field, which can be selected depending on the intended use.

As an alternative to filtering a suitably designed reference mark scanning fields, filtering in accordance with the invention can also take place by suitable embodiment, or respectively structuring, of one or several detector elements.

Further advantages as well as details of the scanning unit designed in accordance with the invention ensue from the following description of the preferred embodiments with the aid of the attached drawings.

BRIEF DESCRIPTION OF SEVERAL VIEWS OF THE DRAWINGS

FIG. 2b is an enlarged plan view of a partial area of the reference pulse scanning field shown in FIG. 2a.

FIG. 3b is a lateral sectional view of the exemplary embodiment in FIG. 3a.

DETAILED DESCRIPTION OF THE PRESENTLY PREFERRED EMBODIMENTS

Figure 1A:
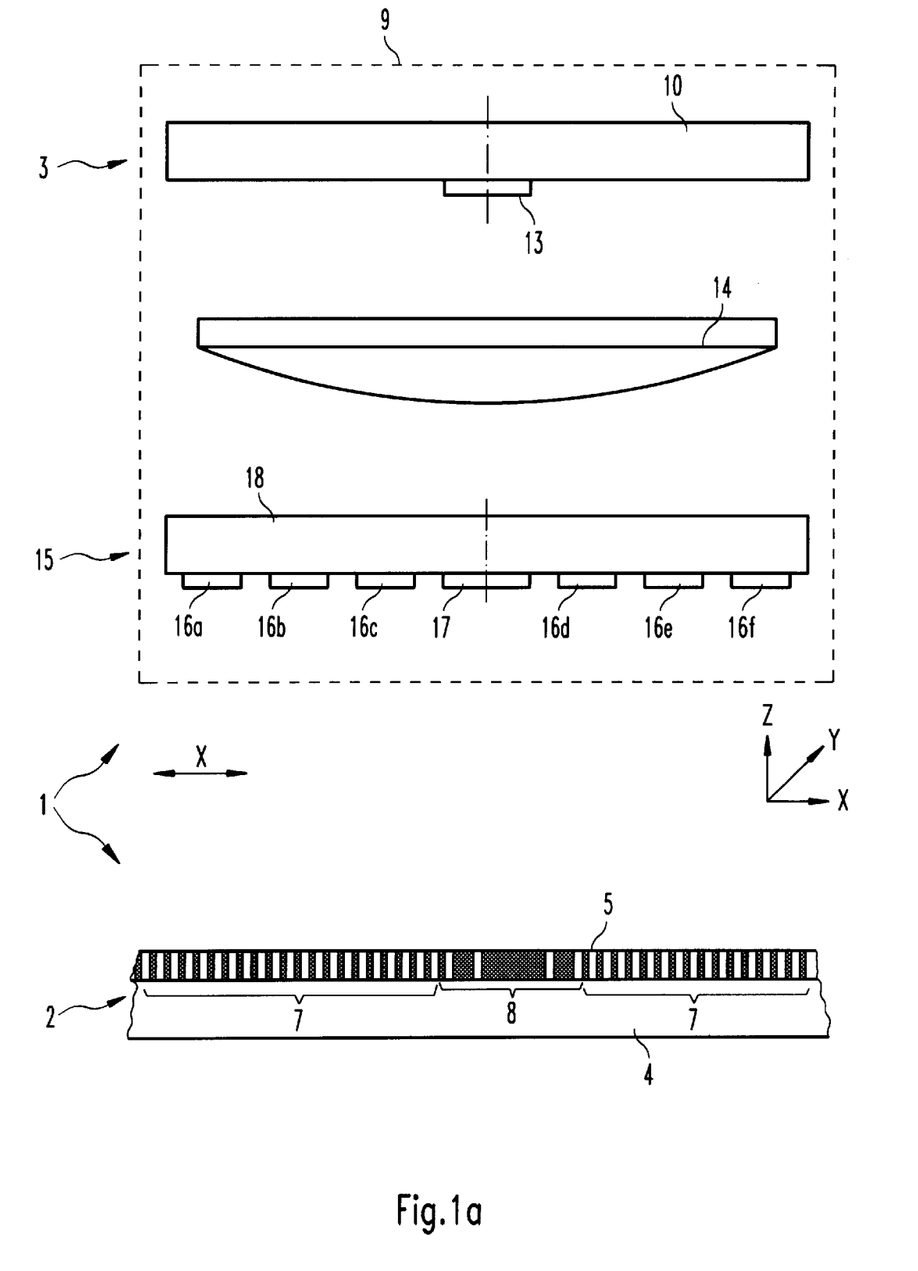
FIG. 1a is a schematic sectional representation of an optical position measuring system with a first preferred embodiment of the scanning unit in accordance with the invention.

An optical position measuring system together with a first preferred embodiment of a scanning unit designed in accordance with the invention is represented in FIG. 1a in a schematic lateral view. The optical position measuring system 1 represented is designed as a reflected light measuring system for detecting the relative position of two objects which can be displaced relative to each other, which for reasons of clarity have not been represented in FIG. 1. One of the two objects is coupled to a scale 2 of the position measuring system 1, the other object is coupled to a scanning unit 3. Objects which can be displaced with relation to each other in the measuring direction X can be, for example, the work piece as well as the tool of a numerically controlled machine tool.

Alternatively with the employment shown in a reflected light measuring system, the scanning unit according to the invention can of course also be used in connection with an optical position measuring system operating with transmitted light. In the same way it is of course possible to equip an optical position measuring system, which is intended to detect rotational relative movements of two objects, with a scanning unit designed in accordance with the invention. Therefore, in connection with the present invention, the preferred embodiments of an optical position measuring system represented should not be considered to be limiting, i.e., the measures in accordance with the invention in connection with the generation, or respectively detection, of reference pulse signals can of course be used in connection with different optical position measuring systems.

In a preferred embodiment, the optical position measuring system 1 represented in FIG. 1a includes a preferably stationary arranged linear scale 2, consisting of a graduation support 4 having at least one graduation track 5 arranged in the measuring direction X. The graduation track 5 is optically scanned by the scanning unit 3, which is movable with respect to the latter, in order to determine the relative position of the two objects to each other. As can be seen in particular in the plan view in FIG. 1b, in the preferred embodiment represented the graduation track 5 consists of a sequence of reflecting and non-reflecting areas 6a, 6b, which extend vertically in the y-direction with respect to the measuring direction X. The graduation track 5 includes an incremental graduation 7 which produces periodically modulated incremental signals in connection with the provided optical scanning, as well as one or several fields with reference marks 8, which mark predetermined absolute positions along the scale 2, or respectively the graduation track 5 with the incremental graduation 7.

Figure 1B:
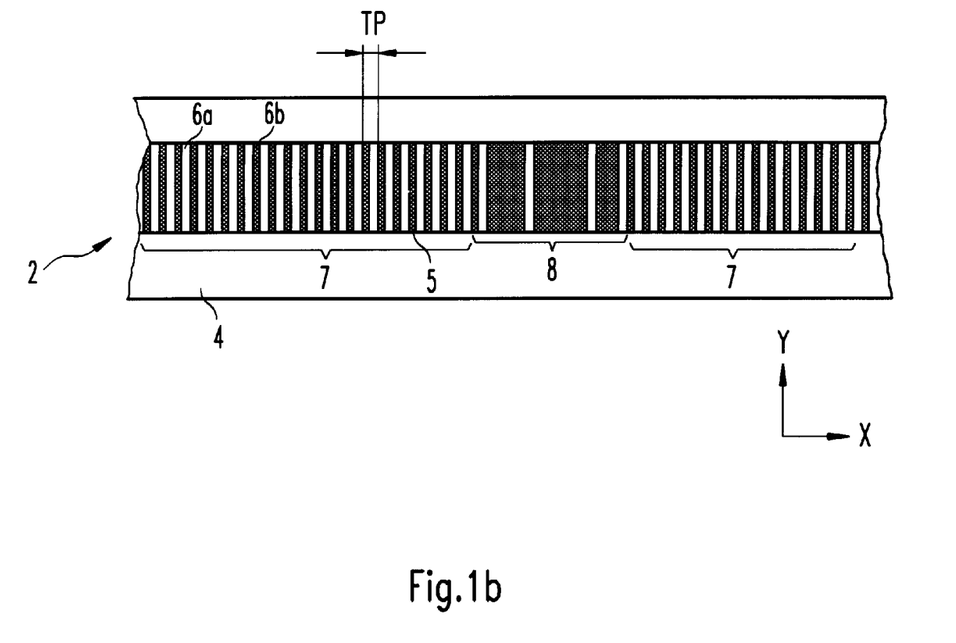
FIG. 1b is a top view of the scale in FIG. 1a according to a preferred embodiment of the present invention.

In contrast to the known, laterally adjoining arrangement of the reference mark 8 in relation to the incremental graduation 7, the fields with the reference mark 8 are therefore integrated into the same graduation track 5 as the incremental graduation 7. Depending on the intended use, it is of course possible to provide a different number of such reference marks 8 along the required measuring distance. The known distance-coded arrangement of several reference mark, for example, is among these.

The advantages of such an arrangement of the reference mark 8 has already been discussed above. At this time, for the purpose of amplification, only the clearly reduced sensitivity of this preferred embodiment in connection with the synchronization of the reference pulse signals in case of a twisting of the scale 2 and the scanning unit 3 around the axis z vertically with respect to the scale plane x—y should be mentioned.

Figure 1C:
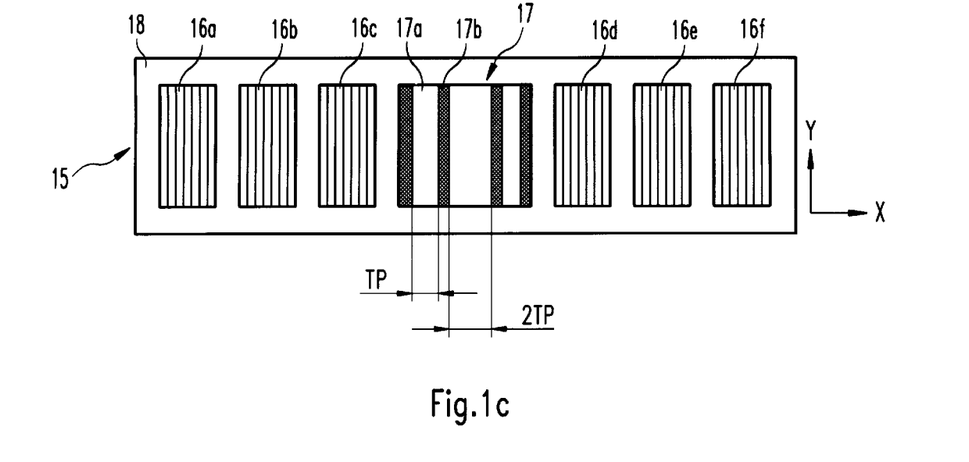
FIG. 1c is a top view of the scanning plate of the scanning unit shown in FIG. 1a according to a preferred embodiment of the present invention.
Figure 1D:
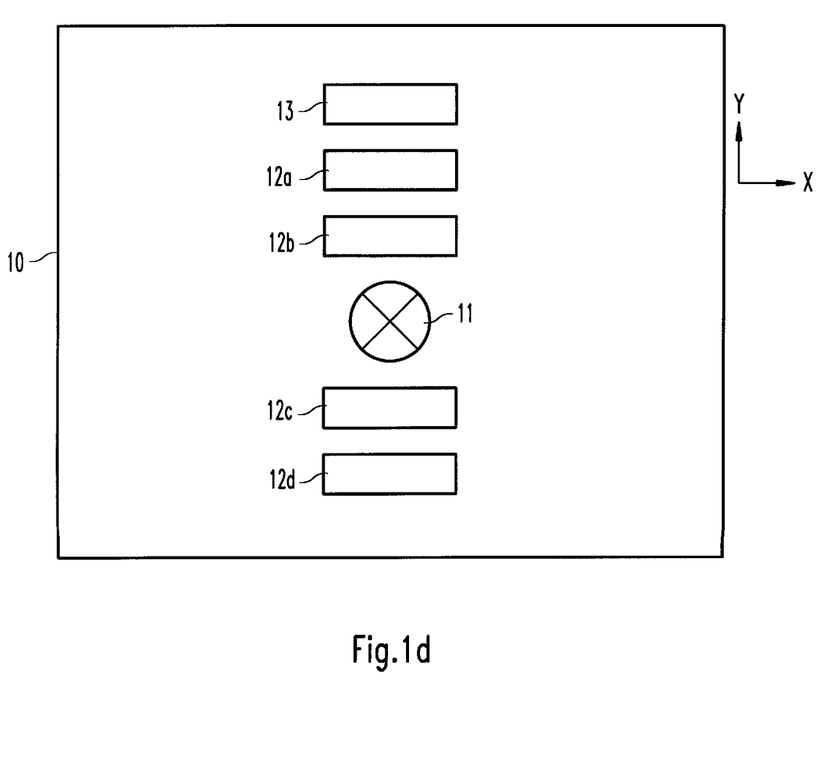
FIG. 1d is a top view of the support plate with a light source and several detector elements arranged in the scanning unit shown in FIG. 1a according to a preferred embodiment of the present invention.

The optical position measuring system 1 represented further includes a scanning unit 3 which is movable in the measuring direction X with respect to the scale 2 and consists of several components which are preferably arranged in a schematically indicated housing 9. Among the different components of the scanning unit 3 shown in the preferred embodiment are a support plate 10 with a light source as well as several opto-electronic detector elements 13, an optical element 14 and a scanning plate 15 with several scanning fields 16a to 16f and 17. The scanning fields 16a to 16f are arranged on a light- permeable support element 18. After collimation, the light emitted by the light source, which preferably is embodied as an LED, arrives via the optical element 14 through the scanning plate 15 on the scale 2, or respectively the graduation track 5, and from there is reflected back on the different detector elements 13 through the scanning plate 15, or respectively the scanning fields 16a to 16f, 17 by the optical element 14. Only the reference pulse detector element 13 can be seen in the representation of FIG. 1a. The light source on the support plate 10 is also not visible. In FIG. 1d, to be described later, the incremental signal detector elements 12a to 12d as well as the light source 11 are also represented.

In case of relative movement between the scanning unit 3 and the scale 2, periodically modulated incremental signals result in the course of scanning the incremental graduation 7 which can be further processed for position determination in conventional evaluation units. Since the particular way of generating the incremental signals merely is one possible variant, reference is made to the previously published EP 0 735 346 A2, or corresponding U.S. Ser. No. 08/616,184 filed Mar. 15, 1998, wherein the scanning principle used in this embodiment is described in detail. The generation of the incremental signals selected for this preferred embodiment is a so-called (quasi) single field scanning, which offers particular advantages in regard to its insensitivity to dirt. It is of course also possible to use a known four-field scanning for generating the incremental signals in connection with the measures in accordance with the invention. It is furthermore not really compelling to employ the optical element 14 used in the example, i.e. basically the following considerations regarding the invention can also be transferred to an optical position measuring system without optical collimation devices.

In the represented preferred embodiment several incremental graduation scanning fields 16a to 16f which, for example, are embodied in accordance with FIG. 8 of the mentioned EP 0 735 346 A2, or corresponding U.S. Ser. No. 08/616,184 filed Mar. 15, 1998, are provided on the scanning plate 15 on a support element 18 of the scanning unit 3 for generating the incremental signals. In this way four incremental signals, respectively offset by 90°, result from the optical scanning of the incremental graduation 7.

A further scanning field 17, which is designed in the manner hereinafter described, is arranged on the scanning plate 15 for scanning the at least one reference mark 8 integrated into the incremental graduation 7. At least one reference pulse detector element 13 is associated with the reference mark scanning field 17 on the support plate 10, by which the detection of the reference pulse signal takes place at at least one predetermined relative position of the scale 2 and the scanning unit 3.

Besides the represented variant with only one reference pulse detector element 13 for detecting the reference pulse signal, it is furthermore basically possible in connection with the scanning arrangement shown to arrange a second detector element on the support plate in order to generate a so-called constant light signal. In this way it is possible to increase the detection assurance for detecting the reference pulse signal by the suitable difference wiring of the two reference pulse detection elements. Again, various options are available for the generation of the constant light signal. Reference by way of example is made to an advantageous embodiment such as described, for example, in the previously published EP 0 754 933 A2. It is proposed there in FIGS. 4 and 5 to provide the transparent areas of the scanning structure partially with a deflecting optical effect, so that it is possible with the aid of a single reference mark scanning field to generate both the actual reference pulse signal and the associated constant light signal.

A top view of a portion of the scale 2 with the scanned incremental graduation 7 and with a reference mark 8 integrated into the incremental graduation 7 is represented in FIG. 1b. Here, the light portions represent the reflecting areas 6a of the graduation track 5, the dark areas 6b located between them are embodied to be non-reflecting. The non-reflecting areas 6b can be etched areas of the basically reflecting graduation support 4 made of steel. In a preferred embodiment represented, the incremental graduation 7 consists of a periodic sequence of reflecting and non-reflecting areas 6a, 6b with a graduation period TP=40 μm, wherein the respective areas 6a, 6b have the same width.

Alternatively to the represented variant of a scale for reflected light scanning, the steps in accordance with the invention can of course also be employed in connection with a transmitted light measuring system. It would then be necessary to provide transmitting areas on the part of the scale in place of the reflecting areas, and correspondingly opaque areas in place of the non-reflecting areas.

No periodic sequence of reflecting and non-reflecting areas 6a, 6b with the graduation period TP of the incremental graduation 7 now exists in the area of the field with the reference mark 8 with the graduation track 5, instead a number of reflecting areas 6a were omitted, so that individual non-reflecting areas 6b result which have a width which is greater than in the case of the periodic arrangement of the incremental graduation 7. Accordingly, the reflecting areas 6a are arranged in the field of the reference mark 8 in the measuring direction X at a distance from each other of either one or several whole number graduation periods of the incremental graduation 7. Such an arrangement is required because with it definite phase relationships between the resulting incremental signals are assured also in the area of the reference mark. In this preferred embodiment, the total length of the represented reference mark 8 on the scale 2 in the measuring direction X is approximately 1.6 mm.

As already indicated, it is of course possible to provide several such reference mark 8 along the scale 2. Furthermore, in the case of a transmitted light measuring system it would be necessary to arrange transparent and opaque areas in the graduation track of the scale in place of the reflecting and non- reflecting areas. Besides, it is also possible to provide several graduation tracks 5 with incremental graduations 7 and integrated reference mark 8 on the part of the scale 2 in a parallel arrangement.

A top view of a scanning plate 15 of the scanning unit 3, designed in accordance with the invention, is represented in FIG. 1c. Here, several scanning fields 16a to 16f, 17 are arranged on a transparent support element 18, for example, made of glass, adjoining each other in the measuring direction X, which are used for scanning the incremental graduation 7 and for scanning the reference mark 8 on the scale 2. In the represented preferred embodiment of the scanning plate 15, the embodiment, or respectively the arrangement of a total of six incremental graduation scanning fields 16a to 16f is provided in accordance with the already mentioned EP 0 735 346 A2, or corresponding U.S. Ser. No. 08/616,184 filed Mar. 15, 1998, which allows the generation of a (quasi) single field scanning and the generation of a total of four incremental signals phase-shifted by 90°. In the represented example, the selected graduation period in the incremental graduation scanning fields 16a to 16d is 40 μm.

Figure 7:
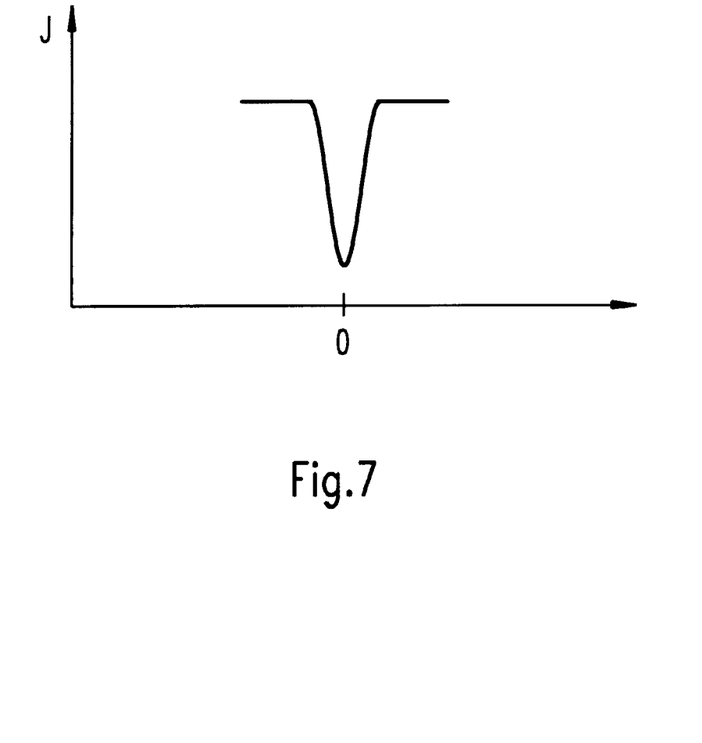
FIG. 7 is a representation of a reference pulse signal generated in accordance with a preferred embodiment of the invention.

A further scanning field 17, which is provided for scanning the reference mark 8 on the scale 2, is arranged between the incremental graduation scanning fields 16a to 16f on the scanning plate 15. The simplest variant of the invention of a reference mark scanning field 17 is shown in the representation of FIG. 1c. The arrangement, or respectively the sequence of the transparent and opaque areas 17a, 17b in the reference mark scanning field 17 was selected to be suitable for scanning the reference mark 8. The optical filtering effect resulting from the reference mark scanning field 17 is created by the selection of the width of the transparent areas 17a of this scanning field 17 in the measuring direction X. Their width in the x-direction is here selected to be identical to the graduation period TP of the scanned incremental graduation 7 or of a whole number multiple thereof. In this way it is already possible to achieve optical filtering in the course of the detection of the reference pulse signal, so that the periodic incremental signal portion in the reference pulse signal next to the reference position is reduced. The cause of this is that with such a size of the reference mark scanning field 17, an averaging over a signal period of the incremental signal always results on the detector side, so that accordingly there is no modulated incremental signal present next to the reference position, but instead a signal with a largely constant intensity progression. The corresponding signal progression in the area of the reference position "0" which results with the aid of a reference mark scanning field 17 designed in this way is represented in FIG. 7.

It is therefore possible by the design in accordance with the invention of the reference mark scanning field 17 with an optical filtering effect to clearly reduce, or respectively eliminate, the periodic incremental signal portion in the reference pulse signal. Different further variations in accordance with the invention regarding the advantageous design of the reference mark scanning field 17, as well as alternative arrangements for filtering this signal portion will yet be explained in detail by means of the following preferred embodiments.

Finally, a top view of the support plate 10 of the scanning unit 3 is represented in FIG. 1d which, besides other elements and the light source 11, contains the various opto-electronic detector elements 12a to 12d, 13, preferably photoelements for detecting the various scanning signals. Besides the four detector elements 12a to 12d for detecting the incremental signals from the incremental graduation scanning fields 16 to 16f, a further reference pulse detector element 13 is provided for detecting the reference pulse signals from the reference mark scanning field 17. As can be seen from the coordinate information in FIGS. 1a to 1d, the different detector elements 12a to 12d, 13 are arranged in the y-direction on the support plate 10, i.e., perpendicularly to the measuring direction X.

In order to make possible such an arrangement with respect to the measuring direction X, it is of course necessary to provide a deflection transversely to the measuring direction X, i.e., in the y-direction, of the light beams reflected in the direction toward the detector elements. In this case the deflection of the light beams used for generating the incremental signals, as well as the phase-determining effect on the light beams is the result of the additionally provided transverse structure in the incremental graduation scanning fields 16a to 16f. Again reference is made with respect with the foregoing to EP 0 735 346 A2.

In order to deflect the light beams passing through the reference pulse scanning field 17 in the y-direction toward the associated reference pulse detector element 13, it is possible to arrange a suitable optical deflection element in the form of a wedge prism on the scanning plate 15 side in the area of the reference mark scanning field 17. Alternatively, it is also possible for the optical element 14 to have a partial area with a correspondingly deflecting optical effect.

However, it should again be pointed out here that the relative arrangement of the different detector elements 12a to 12d, 13 with respect to the measuring direction X and their number are not important for the invention. It is accordingly possible in connection with alternative embodiment to provide a different scanning arrangement, for example, a conventional four-field scanning with detector elements arranged parallel with the measuring direction X.

The representation of an evaluation unit which further processes the incremental and reference pulse signals provided by the position measuring system for the purpose of position determination was omitted in the representations shown in FIGS. 1a to 1d. This could be, for example, a known numeric machine tool control.

Figure 2A:
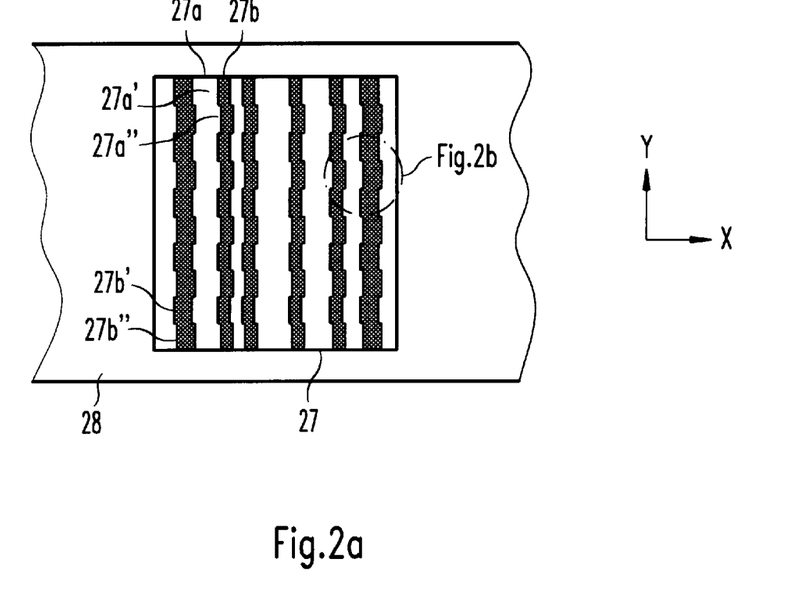
FIG. 2a is a partial top view of a scanning plate according to a second preferred embodiment of a reference pulse scanning field design in accordance with the invention.

A top view of a second preferred embodiment of a reference mark scanning field 27 designed in accordance with the invention is represented in FIG. 2a, which represents a portion of a scanning plate of the scanning unit. The marked partial area of the reference mark scanning field 27 in FIG. 2a is shown enlarged in FIG. 2b. This preferred embodiment of a reference mark scanning field 27 can of course also be employed in connection with a scanning geometry corresponding to the previous example.

In this preferred embodiment, a structure in the measurement direction X is again provided within the reference mark scanning field 27, which consists of a sequence of transparent and opaque areas 27a, 27b extending in the y-direction. Again, the sequence of the transparent and opaque areas 27a, 27b, or respectively the arrangement of their centers of gravity in the measuring direction X has been selected as a function of the sequence of the transparent and opaque areas of the reference mark (not shown) to be scanned on the scale.

Figure 2B:
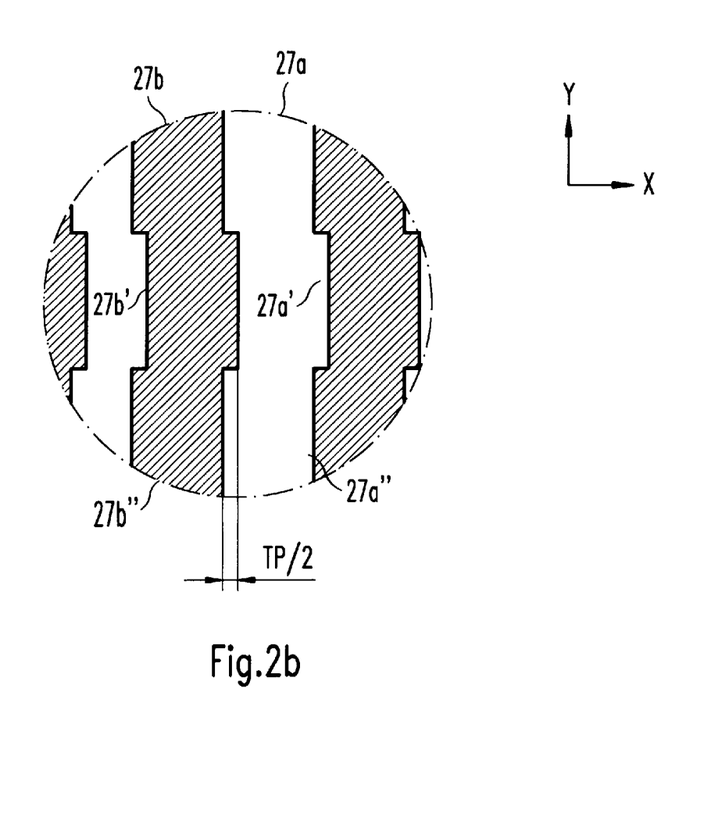

Furthermore, in the represented preferred embodiment of the reference mark scanning field 27, periodic structuring perpendicularly, or respectively transversely, in relation to the measuring direction X is provided, i.e., in the y-direction. To this end the elongated, transparent, or respectively opaque areas 27a, 27b are divided into partial areas 27a', 27a", 27b', 27b". In this case the neighboring, or respectively adjoining partial areas 27a', 27a", or respectively 27b', 27b" are arranged inside each transparent, or respectively opaque area 27a, 27b offset from each other by half a graduation period TP/2 of the scanned incremental graduation. The enlarged partial representation in FIG. 2b is pointed out in particular regarding this offset of the partial areas 27a', 27a", 27b', 27b" in the x-direction. In the preferred embodiment represented in FIG. 2a, a total of ten partial areas 27a', 27a", 27b', 27b" per transparent, or respectively opaque area 27a, 27b are provided. With a possible scanning of a graduation period TP of 40 $\mu$m, a width of the scanning field 27 in the y-direction of 4 mm is provided.

Such additional structuring of the reference mark scanning field 27 now also results in an optical filtering effect in the course of scanning the reference marks on the scale in such a way that the periodic portion of the incremental signals at the reference pulse signal next to the reference position is eliminated, or respectively at least the corresponding fundamental wave portion of the incremental signals is filtered. In this way, in the course of scanning the incremental graduation, partial signals with opposite phase modulation result from the different transparent partial areas 27a', 27a" offset with respect to each other. Therefore the entire period portion of the incremental signals is averaged away, i.e., only a signal portion with a constant signal amplitude remains, which is detected by the detector element associated with the reference mark scanning field 27 adjoining the reference position "0". The reference pulse signal at the reference position has a modulation, or respectively signal intensity with respect to this signal portion which is sufficient for detection, so that this signal can be detected surely.

It should already be pointed out at this point, that the example described in FIGS. 2a and 2b also is only a further possible variant for the embodiment in accordance with the invention of the reference pulse scanning field. As will be further illustrated below, still other possibilities of structuring the reference mark scanning field of course exist for achieving such an optical filtering effect in the course of scanning the reference marks integrated into the incremental graduation and for eliminating the undesired periodic incremental signal portion, or respectively at least its carrier in the reference pulse signal.

The filtering by means of the suitable design, or respectively structuring of the reference mark scanning field proposed in FIGS. 2a and 2b once again results in an improved filter effect in comparison with the first embodiment in FIGS. 1a to 1d. Because of the diffraction effects, there is, as a rule, an intensity distribution between the scanned scale and the scanning unit, which makes filtering merely on the basis of the suitable width of the transparent areas of the reference mark scanning fields more difficult. In addition, in case of possible tilting of the scale around the y-axis, the available openings of the transparent areas of the reference mark scanning field change, so that in this case, too, no optimum filtering effect results. In contrast thereto, the embodiment of the reference mark scanning field 27 proposed in FIGS. 2a and 2b already provides an improved filtering effect.

A further advantageous design of the reference mark scanning field on the basis of the considerations in connection with the invention will be explained by the following third preferred embodiment with reference to FIGS. 3a and 3b. While with respect to the embodiment of the reference mark scanning field the previous variants were all based on filtering effects which were created by amplitude grating structures, or respectively corresponding screen structures with transparent and opaque areas, in accordance with the following preferred embodiment it is also possible to achieve a filtering effect by means of suitably embodied phase structures in the transparent areas of the reference mark scanning field.

Figure 3A:
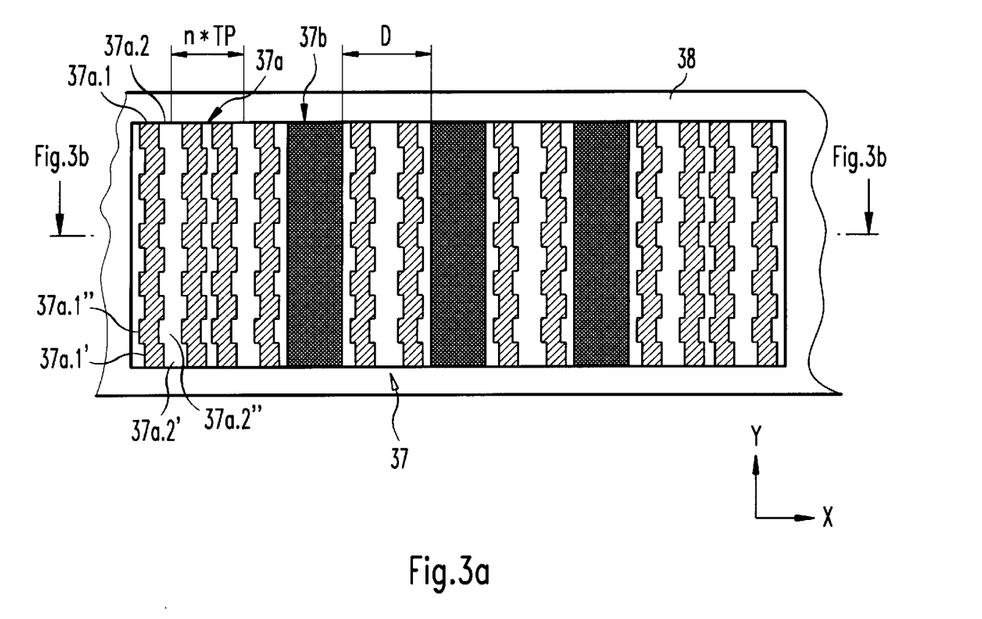
FIG. 3a is a partial top view of a scanning plate according to a third preferred embodiment of a reference pulse scanning field designed in accordance with the invention.

FIG. 3a represents a top view of a preferred embodiment of an appropriately designed reference mark scanning field 37. A cross section thereof along the line drawn in FIG. 3a is represented in FIG. 3b.

The reference mark scanning field 37 has transparent areas 37a and opaque areas 37b arranged next to each other in the measuring direction X. Now, for filtering the periodic incremental signal portion of the reference pulse signal, a defined phase structure is provided within the transparent areas 37a. This consists of areas 37a.1, 37a.2 with different diffraction indices for the passing light beams, arranged alternatingly in sequence in the measuring direction X, which is intended to be indicated in FIGS. 3a and 3b by the cross-hatched and not cross-hatched areas 37a.1 and 37a.2. Further structuring in the y-direction is provided within these areas 37a.1 and 37a.2 in such a way, that partial areas 37a.1', 37a.1", 37a.2', 37a.2", which respectively adjoin each other in the y-direction, are arranged offset from each other by half a graduation period TP of the scanned incremental graduation.

Therefore the transparent areas 37a of the reference mark scanning field are embodied as diffractive optical elements, which for one have a focusing optical effect on the light beams passing through them. In the course of this, because of the selected embodiment of the diffractive optical elements, a linear-shaped focusing of the light beams coming from the light source into the plane of the graduation track on the scale results, wherein the resulting focal lines are aligned in the y-direction, i.e., in the longitudinal direction of the reflecting and non-reflecting areas of the graduation structure on the scale.

A further result of the selected offset of the partial areas 37a.1', 37a.1", 37a.2', 37a.2" with respect to each other is a respective offset of the associated focal lines by half a graduation period, and therefore the desired filtering effect for the incremental signal portion of the reference pulse signal. The signal portions from the partial areas 37a.1', 37a.1", 37a.2', 37a.2" are modulated in opposite phases and cancel each other out by averaging.

Figure 3B:
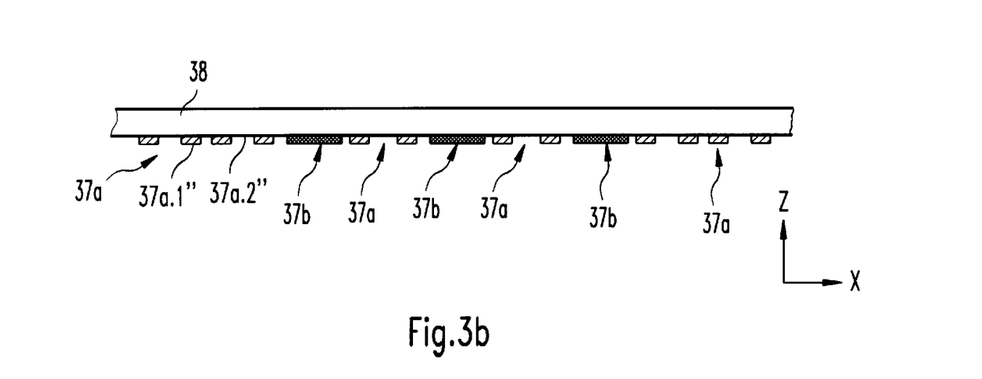

In the case of the last mentioned steps, i.e., the arrangement of suitably embodied diffractive optical elements with a focusing effect in the transparent areas 37a of the reference mark scanning field 37 in accordance with FIGS. 3a and 3b, it is preferably possible to select the respective width D of these areas 37a to be greater in the measuring direction X. For example, because of the focusing effect of the diffractive optical element, the widths D of the transparent areas 37a of a reference mark scanning field 37 designed in this way can be embodied to be of the size of two or more graduation periods of the scanned incremental graduation. For one, it is possible in this way to achieve a higher signal intensity on the detector side. Furthermore, with an embodiment of this type an advantageous further effect results in the detection of the reference pulse signal. With a slight tilt of the scale vertically in relation to the scale direction, i.e., around the y-direction, only a relatively small portion of the light beam cross section is blocked during the second passage of the light beams through the reference pulse scanning field. Even with such a tilt, a sufficient signal intensity still results on the detector side. Altogether the result therefore is an insensitivity of the total system to possible tilting of the scale and scanning unit from an ideal relative position.

The distances between the centers of gravity of those areas with the same diffraction indices should preferably be selected in such a way that nTP applies, wherein n represents a whole number. Furthermore, the width D of the transparent areas 37a in the x-direction should be made of such a size that, taking into consideration the image factor of the focusing optical elements, the transparent areas 37a have a width D which corresponds to the graduation period TP of the incremental graduation.

For example, diffractive cylinder zone plates with a binary structure, or Fresnel cylinder lenses with a blazed structure can be used as suitable diffractive elements in the transparent partial areas 37a. Besides these, phase-adapted Fresnel cylinder lens elements are also suitable in an advantageous manner. Furthermore, it is of course also possible to insert optical elements in the form of cylinder lenses into the transparent partial areas of the scanning field.

Both the mentioned embodiments of focusing optical elements and also further alternatives with the optical properties mentioned can be integrated into the scanning unit in accordance with the invention, or respectively into the reference mark scanning field.

In the sense of the present invention, the focusing properties of such elements are not only to be understood to be the exact focusing of collimated light beam, as is the case in the preferred embodiment represented. Instead it is also possible to only provide an at least partially focusing effect of these elements, depending on the scanning arrangement. For example, a partially focusing effect might be sufficient in case of illumination without a collimating optical element, or respectively in case of a partially collimated illumination.

Besides the filtering arrangements, so far discussed by the two preferred embodiments, with the aid of amplitude or phase structures in the reference mark scanning field, it is of course also possible to employ filter variations which combine these two principles. For example, in the preferred embodiment in FIGS. 2a and 2b it is possible to provide the transparent areas 27a of the reference mark scanning field 27 with a sub-structure in accordance with the preferred embodiment of FIGS. 3a and 3b. The result therefore is a combined filter effect on the basis of filtering amplitude and phase structures.

Figure 4:
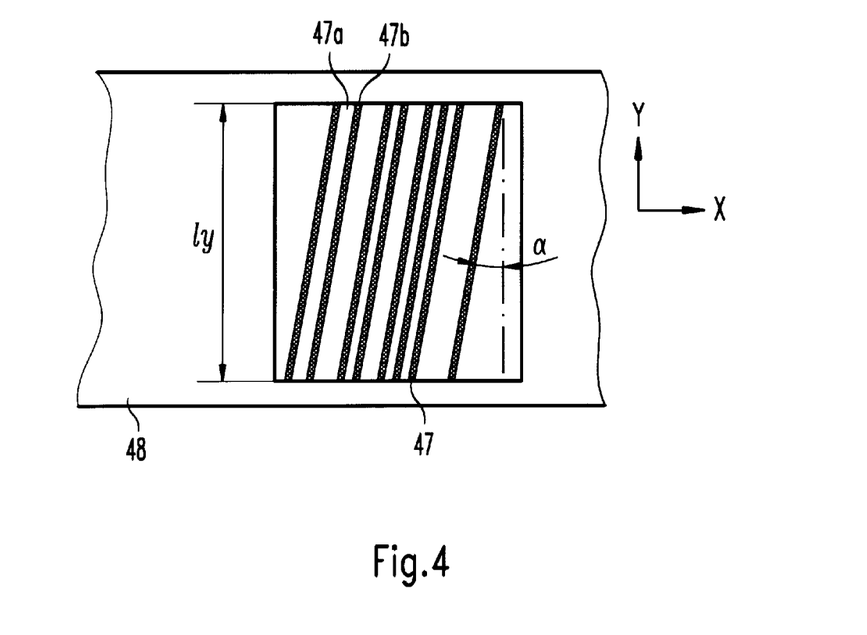
FIG. 4 is a partial top view of a scanning plate with the fourth exemplary embodiment of a reference pulse scanning field designed in accordance with a preferred embodiment of the invention.
Figure 5:
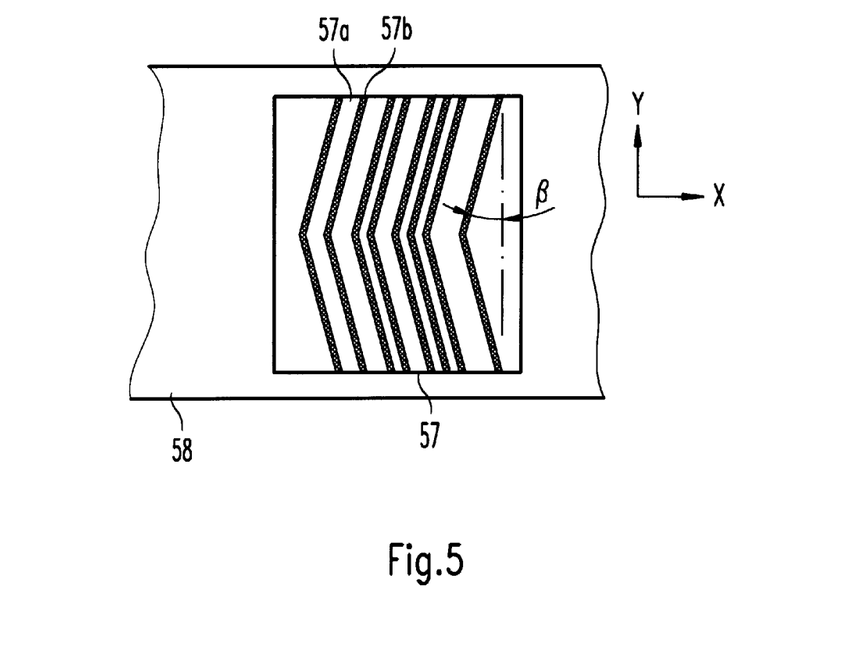
FIG. 5 is a partial top view of a scanning plate with the fifth exemplary embodiment of a reference pulse scanning field designed in accordance with a preferred embodiment of the invention.

Further variants regarding the possible design of the filter structure of the reference mark scanning fields are represented in FIGS. 4 and 5. While again amplitude structures inside the reference mark scanning field are used for filtering, it is of course also possible to combine such amplitude structures in the reference mark scanning field with suitable phase structures for achieving the desired filtering effect.

In accordance with FIG. 4 therefore an oblique arrangement of the transparent and opaque areas 17.1a, 17.1b in the reference mark scanning field 17.1 on the scanning plate 18.1 as the filter structure is also possible. The different areas 17.1a, 17.1b here are arranged at an angle α in relation to the scale incremental graduation in the reference mark scanning field 17.1. In this case the angle a should be selected in such a way that the beginnings and ends of the areas 17.1a, 17.1b over the length ly differ in their x-coordinates by one graduation period of the scanned graduation period TP. This means that, because of their inclination in relation to the incremental graduation, the areas 17.1a, 17.1b respectively extend in the x-direction over one graduation period of the scanned incremental graduation.

In accordance with the preferred embodiment shown in FIG. 5, a V-shaped arrangement of the transparent and opaque areas 17.2a, 17.2b in the reference mark scanning field 17.2 on the scanning plate 18.2 is also possible as a filter structure for effecting the elimination of the period signal portion in the reference pulse signal. The arrangement of the two legs of the V here takes place at the angles β in relation to the scale incremental graduation. Regarding the suitable selection of this angle it applies to both legs of the V that because of their inclination in relation to the incremental graduation in the x-direction they respectively extend over one graduation period of the scanned incremental graduation.

Further filtering options on the part of the reference mark scanning field provide the use of so-called vernier filters, in which the transparent areas in the example of the reference mark scanning field in FIG. 1c are displaced in a defined manner with respect to the corresponding positions of the omitted lines of the reference mark of the scale. For filtering it is furthermore also possible to employ cosine-shaped slit openings of a width of two graduation periods on the scanning plate. The slit openings and/or the phase structures can also have a curved path.

All these variants respectively cause the elimination of the period signal portion of the reference signal. It is of course also possible in case of these as well as any further possible filtering variants to arrange a phase structure with focusing optical elements in the transparent areas of the reference pulse scanning field.

While so far only the filtering in accordance with the invention of the undesired incremental signal portion of the reference signal was described by a suitable design of the reference mark scanning field, it is furthermore possible within the scope of the present invention to remove or at least to reduce this signal portion by the suitable design of the detector elements. Reference is made to the preferred embodiment of a detector arrangement represented in FIG. 6 in regard to the possible design of the detector elements provided for this. In case of such a filter variant the otherwise required separate scanning plate is of course omitted.

Figure 6:
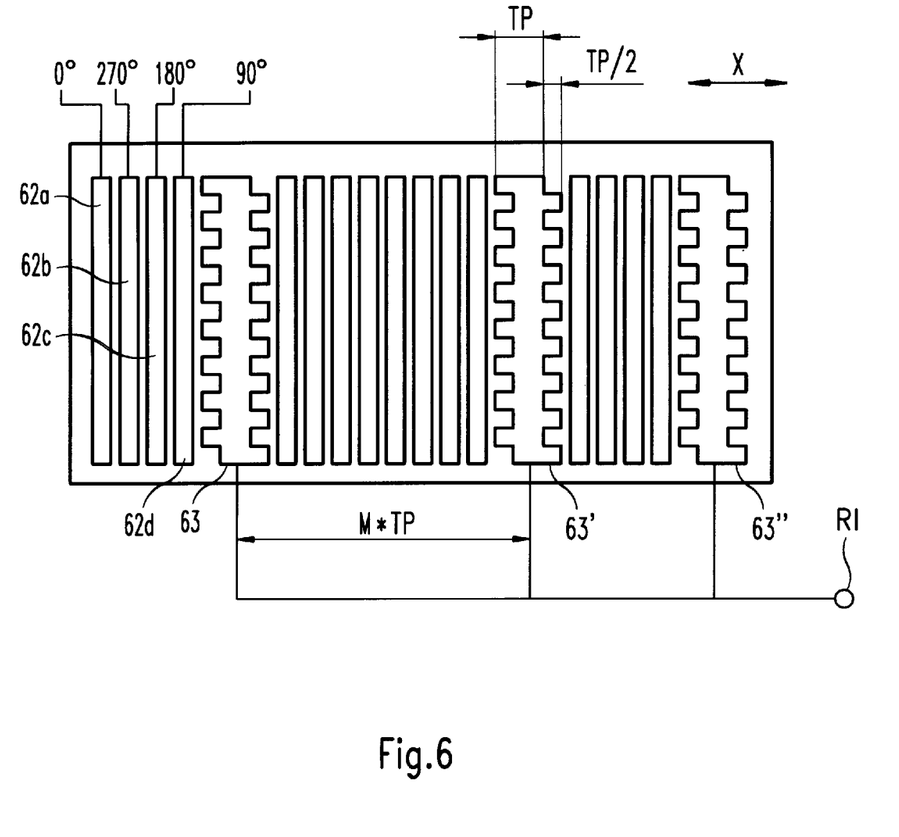
FIG. 6 is a top view of the arrangement of several reference mark detection elements, which also assure the filter effect in accordance with a preferred embodiment of the invention.

In this connection FIG. 6 represents an adjoining arrangement of the different opto-electronic detector elements 62a to 62d, 63, 63', 63" in the measuring direction, which is also suitable for scanning a reference mark integrated into the incremental graduation. To this end, detector elements 62a to 62d for the incremental signals are provided on an appropriate support plate and are arranged and connected in groups. In turn, the reference pulse detector elements 63, 63', 63" are arranged between these groups of detector elements. In this case a first reference pulse detector element 63 is provided next to a group of four detector elements 62a to 62d. Thereafter two groups of four detector elements for the incremental signals follow, behind which a second reference pulse detector element 53', a second group of four detector elements for the incremental signals and finally a third reference pulse detector element 63" are arranged.

A 0° scanning signal results from a circuit connection of the respectively first detector elements from the left in the groups of four, a 90° scanning signal from the circuit connection of the respectively fourth detector elements. The reference pulse signal at the signal pickup RI in turn results from the indicated parallel circuit connection of the three reference pulse detector elements 63, 63', 63".

The arrangement variant of the different detector elements represented here results as a function of the reference mark to be detected and is appropriately adapted to it. In connection with the distances of adjoining reference pulse detector elements 63, 63', 63", care should be taken in the described circuit connection variant of the detector elements that it is a whole number multiple M of the graduation period TP of the scanned incremental graduation. The width of each reference pulse detector element 63, 63', 63" corresponds to one graduation period TP in the preferred embodiment shown.

In order to achieve the desired filtering effect regarding the incremental signal portion of the reference pulse signal, the reference pulse detector elements 63, 63', 63" respectively have a defined filtering structure perpendicularly to the measuring direction X. Thus, respective individual partial areas of a single reference pulse detector element 63, 63', 63" are arranged offset with respect to each other in the measuring direction X by one half graduation period. In this way a cancellation of the incremental signal portions of the reference pulse signals, which are modulated in opposite phases and which impinge on different partial areas, also results on average.

By means of such filtering on the detector side it is possible in accordance with the invention to eliminate the undesired periodic portion of the incremental signal next to the reference position.

The foregoing description of the preferred embodiments of the present invention has been presented for purposes of illustration and description. It is not intended to be exhaustive or to limit the invention to the precise form. Many modifications and variations will be apparent to practitioners skilled in the art.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

What is claimed is:

1. A position measuring system which generates periodic incremental signals and at least one reference pulse signal next to at least one reference position, the system comprising:
   a scale comprising an incremental gradiation with an integrated reference mark; and
   a scanning unit movable relative to the scale along a measuring direction, wherein the scanning unit comprises a scanning plate comprising a reference mark scanning field and at least one reference pulse detector element for scanning a reference mark on the scale, wherein a filtering effect results through the design of the reference mark scanning field in such a way that a periodic incremental signal portion of a reference pulse signal next to a reference position is eliminated to a great extent.

2. The system according to claim 1, wherein the reference mark scanning field has transparent and opaque areas which adjoin each other in the measuring direction, wherein for the purpose of achieving the filtering effect, the transparent areas have a width in the measuring direction which corresponds to a graduation period or a whole number multiple of the graduation period of the scanned incremental graduation on the scale side.

3. The system according to claim 1, wherein the reference mark scanning field has transparent and opaque areas which adjoin each other in the measuring direction and are divided perpendicularly in relation to the measuring direction into respectively several partial areas, and that for achieving the filtering effect, adjoining partial areas are arranged offset from each other in the measuring direction in such a way that signal portions resulting from adjoining partial areas undergo an opposite phase modulation and cancel each other out on average.

4. The system according to claim 3, wherein the several partial areas are displaced with respect to each other by respectively one half a graduation period of the scanned incremental graduation.

5. The system according to claim 1, wherein the reference mark scanning field has transparent and opaque areas which adjoin each other in the measuring direction, wherein for the purpose of achieving the filtering effect these areas are arranged at such an angle in relation to the scanned incremental graduation, that over the area length the beginnings and ends of the areas differ in their measuring coordinate by a graduation period of the scanned incremental graduation.

6. The system according to claim 1, wherein the reference mark scanning field has transparent and opaque areas which adjoin each other in the measuring direction, wherein for the purpose of achieving the filtering effect, these areas are arranged in a V shape in respect to the measuring direction and wherein the two V legs assume an angle in relation to the incremental graduation which has been selected such that the two V legs extend in the measuring direction over respectively one graduation period of the scanned incremental graduation.

7. The system according to claim 1, wherein the reference mark scanning field has transparent and opaque areas which adjoin each other in the measuring direction wherein for the purpose of achieving the filtering effect, the transparent areas have a phase structure.

8. The system according to claim 1, wherein the reference mark scanning field has transparent and opaque areas which adjoin each other in the measuring direction, and that focusing optical elements are arranged in the transparent areas, whose linear-shaped foci lie in the plane of the scanned reference marks on the scale, wherein for the purpose of achieving the filtering effect the light beams focused by the different partial areas provide signals modulated in opposite phase on the detector side, which cancel each other out on average.

9. The system according to claim 8, wherein the transparent areas are arranged, which have different diffraction indices, adjoin each other in the measuring direction and are divided perpendicularly in respect to the measuring direction into respective partial areas which are arranged offset in respect to each other in the measuring direction by one half a graduation period of the scanned incremental graduation.

10. The system according to claim 8, wherein the focusing optical elements are embodied as diffractive optical elements.

11. The system according to claim 1, wherein the reference mark integrated into the incremental graduation comprises an aperiodic sequence of reflecting/transmitting and non- reflecting/opaque areas, wherein the widths of the reflecting/transmitting areas are identical in respect to each other as well as to the reflecting/transmitting areas of the incremental graduation and are at a distance from the respectively next reflecting/transmitting area which is equal to one graduation period or a whole number multiple of the graduation period of the incremental graduation.

12. The system according to claim 1, wherein the scale is designed for reflected light scanning and the graduation structure of the scale has reflecting and non-reflecting areas disposed next to it.

13. A position measuring system which generates periodic incremental signals and at least one reference pulse signal next to at least one reference position, the system comprising:
   a scale comprising an incremental gradiation with an integrated reference mark; and
   a scanning unit movable relative to the scale along a measuring direction, wherein the scanning unit comprises a scanning plate comprising a reference mark scanning field and at least one reference pulse detector element for scanning a reference mark on the scale, wherein a filtering effect results through the design of one or several reference mark detector elements in such a way that a periodic incremental signal portion of a reference pulse signal next to a reference position is eliminated to a great extent.

14. The system according to claim 13 wherein at least one reference mark detector element has a defined filtering structure perpendicularly to the measuring direction.

15. The system according to claim 14 wherein the reference mark detector element has partial areas which are arranged offset with respect to each other in the measuring direction by one half graduation period.

16. A position measuring system which generates periodic incremental signals and at least one reference pulse signal next to at least one reference position, the system comprising:
   a scale comprising an incremental gradiation with an integrated reference mark; and a scanning unit movable relative to the scale along a measuring direction, wherein the scanning unit comprises a scanning plate comprising a reference mark scanning field, a plurality of incremental graduation scanning fields and at least one reference pulse detector element for scanning the reference mark on the scale and a plurality of incremental signal detector elements for scanning the incremental graduation, wherein a filtering effect results through the design of the at least one reference mark scanning field in such a way that periodic incremental signal portion of a reference pulse signal next to a reference position is eliminated to a great extent.

17. The system according to claim 16, wherein the reference mark scanning field has transparent and opaque areas which adjoin each other in the measuring direction, wherein for the purpose of achieving the filtering effect, the transparent areas have a width in the measuring direction which corresponds to a graduation period or a whole number multiple of the graduation period of the scanned incremental graduation on the scale side.

18. The system according to claim 16, wherein one of the at least one reference mark scanning field has transparent and opaque areas which adjoin each other in the measuring direction and are divided perpendicularly in relation to the measuring direction into respectively several partial areas, and that for achieving the filtering effect, adjoining partial areas are arranged offset from each other in the measuring direction in such a way that signal portions resulting from adjoining partial areas undergo an opposite phase modulation and cancel each other out on average.

19. The system according to claim 18, wherein the several partial areas are displaced with respect to each other by respectively one half a graduation period of the scanned incremental graduation.

20. The system according to claim 16, wherein one of the at least one reference mark scanning field has transparent and opaque areas which adjoin each other in the measuring direction, wherein for the purpose of achieving the filtering effect these areas are arranged at such an angle in relation to the scanned incremental graduation, that over the area length the beginnings and ends of the areas differ in their measuring coordinate by a graduation period of the scanned incremental graduation.

21. The system according to claim 16, wherein one of the at least one reference mark scanning field has transparent and opaque areas which adjoin each other in the measuring direction, wherein for the purpose of achieving the filtering effect, these areas are arranged in a V shape in respect to the measuring direction and wherein the two V legs assume an angle in relation to the incremental graduation which has been selected such that the two V legs extend in the measuring direction over respectively one graduation period of the scanned incremental graduation.

22. The system according to claim 16, wherein one of the at least one reference mark scanning field has transparent and opaque areas which adjoin each other in the measuring direction wherein for the purpose of achieving the filtering effect, the transparent areas have a phase structure.

23. The system according to claim 16, wherein one of the at least one reference mark scanning field has transparent and opaque areas which adjoin each other in the measuring direction, and that focusing optical elements are arranged in the transparent areas, whose linear-shaped foci lie in the plane of the scanned reference marks on the scale, wherein for the purpose of achieving the filtering effect the light beams focused by the different partial areas provide signals modulated in opposite phase on the detector side, which cancel each other out on average.

24. The system according to claim 23, wherein the transparent areas are arranged, which have different diffraction indices, adjoin each other in the measuring direction and are divided perpendicularly in respect to the measuring direction into respective partial areas which are arranged offset in respect to each other in the measuring direction by one half a graduation period of the scanned incremental graduation.

25. The system according to claim 23, wherein the focusing optical elements are embodied as diffractive optical elements.

26. The system according to claim 16, wherein the reference mark integrated into the incremental graduation comprises an aperiodic sequence of reflecting/transmitting and non- reflecting/opaque areas, wherein the widths of the reflecting/transmitting areas are identical in respect to each other as well as to the reflecting/transmitting areas of the incremental graduation and are at a distance from the respectively next reflecting/transmitting area which is equal to one graduation period or a whole number multiple of the graduation period of the incremental graduation.

27. The system according to claim 16, wherein the scale is designed for reflected light scanning and the graduation structure of the scale has reflecting and non-reflecting areas disposed next to it.

28. A position measuring system which generates periodic incremental signals, the system comprising:
    a scale; and
    a scanning unit movable relative to the scale along a measuring direction, wherein the scanning unit comprises a scanning plate comprising a reference mark scanning field and at least one reference pulse detector element for scanning a reference mark on the scale, wherein a filtering effect results through the design of the reference mark scanning field in such a way that a periodic incremental signal portion of a reference pulse signal next to a reference position is eliminated to a great extent,
    wherein the reference mark scanning field has transparent and opaque areas which adjoin each other in the measuring direction and are divided perpendicularly in relation to the measuring direction into respectively several partial areas, and that for achieving the filtering effect, adjoining partial areas are arranged offset from each other in the measuring direction in such a way that signal portions resulting from adjoining partial areas undergo an opposite phase modulation and cancel each other out on average.

29. The system according to claim 28, wherein the several partial areas are displaced with respect to each other by respectively one half a graduation period of the scanned incremental graduation.

* * * * *

UNITED STATES PATENT AND TRADEMARK OFFICE
CERTIFICATE OF CORRECTION

PATENT NO. : 6,198,534 B1 Page 1 of 1
DATED : March 6, 2001
INVENTOR(S) : Volker Höfer et al.

It is certified that error appears in the above-identified patent and that said Letters Patent is hereby corrected as shown below:

Title page,
Under "Foreign Application Priority Data", change "197 34 136" to
-- 197 34 136.5 --.

Claim 1,
Line 5, change "gradiation" to -- graduation --.

Signed and Sealed this

First Day of January, 2002

Attest:

Attesting Officer

JAMES E. ROGAN
*Director of the United States Patent and Trademark Office*